United States Patent
Numata et al.

(10) Patent No.: US 11,276,420 B2
(45) Date of Patent: Mar. 15, 2022

(54) INTERACTION SYSTEM, APPARATUS, AND NON-TRANSITORY COMPUTER READABLE STORAGE MEDIUM

(71) Applicant: Hitachi, Ltd., Tokyo (JP)

(72) Inventors: Takashi Numata, Tokyo (JP); Yasuhiro Asa, Tokyo (JP); Nobuhiro Fukuda, Tokyo (JP)

(73) Assignee: HITACHI, LTD., Tokyo (JP)

( * ) Notice: Subject to any disclaimer, the term of this patent is extended or adjusted under 35 U.S.C. 154(b) by 95 days.

(21) Appl. No.: 16/596,809

(22) Filed: Oct. 9, 2019

(65) Prior Publication Data

US 2020/0152225 A1  May 14, 2020

(30) Foreign Application Priority Data

Nov. 9, 2018 (JP) .............................. JP2018-211609

(51) Int. Cl.
  *G10L 25/63* (2013.01)
  *B25J 11/00* (2006.01)
  *G10L 15/22* (2006.01)

(52) U.S. Cl.
  CPC ............ *G10L 25/63* (2013.01); *B25J 11/001* (2013.01); *B25J 11/0015* (2013.01); *G10L 15/22* (2013.01)

(58) Field of Classification Search
  CPC ........ G10L 25/63; G10L 15/22; G10L 15/26; G10L 21/10; B25J 11/001
  USPC ........................................................ 704/231
  See application file for complete search history.

(56) References Cited

U.S. PATENT DOCUMENTS

| | | | | |
|---|---|---|---|---|
| 7,711,569 B2* | 5/2010 | Takeuchi | ............ | G06F 16/3329 704/275 |
| 8,965,762 B2* | 2/2015 | Song | ........................ | G10L 25/63 704/236 |
| 9,634,855 B2* | 4/2017 | Poltorak | ............ | G06K 9/00302 |
| 9,812,151 B1* | 11/2017 | Amini | ...................... | G10L 15/26 |
| 10,096,319 B1* | 10/2018 | Jin | .......................... | G10L 25/66 |
| 10,116,748 B2* | 10/2018 | Farmer | .................. | B60K 35/00 |
| 2001/0037193 A1* | 11/2001 | Nagisa | ................ | G06F 16/3334 704/9 |
| 2004/0006483 A1* | 1/2004 | Sasaki | ...................... | G10L 15/22 704/277 |
| 2006/0287850 A1* | 12/2006 | Morikawa | ............... | G10L 15/22 704/200 |

(Continued)

FOREIGN PATENT DOCUMENTS

JP  2012-181697 A  9/2012

*Primary Examiner* — Thuykhanh Le
(74) *Attorney, Agent, or Firm* — Mattingly & Malur, PC

(57) ABSTRACT

An interaction system that provides an interaction interface comprising: a computer and a device that obtains information, wherein the computer stores information for managing data in which a type of a second feature value is associated with a listening pattern that defines a tendency of a response action performed by the interaction interface on a user; calculates a first feature value that is an index for evaluating a change in state during speech by the user on the basis of information obtained by the device; calculates second feature values on the basis of the first feature value; selects a target second feature value from among the second feature values; selects the listening pattern corresponding to the target second feature value; and generates output information for controlling the interaction interface on the basis of the selected listening pattern.

14 Claims, 11 Drawing Sheets

(56) References Cited

U.S. PATENT DOCUMENTS

| | | | | |
|---|---|---|---|---|
| 2013/0226578 | A1* | 8/2013 | Bolton | G06Q 10/1057 704/235 |
| 2014/0002464 | A1* | 1/2014 | Furukawa | G06T 13/80 345/474 |
| 2014/0032215 | A1* | 1/2014 | Bolton | H04N 21/238 704/235 |
| 2014/0046661 | A1* | 2/2014 | Bruner | G06F 40/56 704/235 |
| 2015/0162000 | A1* | 6/2015 | Di Censo | G06F 16/433 704/270.1 |
| 2015/0314454 | A1* | 11/2015 | Breazeal | B25J 9/0003 700/259 |
| 2015/0373477 | A1* | 12/2015 | Norris | H04S 1/007 381/303 |
| 2015/0381938 | A1* | 12/2015 | Cunico | G06K 9/6202 348/14.1 |
| 2016/0042226 | A1* | 2/2016 | Cunico | G06N 5/022 382/103 |
| 2016/0104486 | A1* | 4/2016 | Penilla | G10L 15/005 704/232 |
| 2016/0236690 | A1* | 8/2016 | Juneja | G01C 21/3661 |
| 2016/0260147 | A1* | 9/2016 | King | G06Q 30/0609 |
| 2017/0011258 | A1* | 1/2017 | Pitre | G16H 40/67 |
| 2017/0061200 | A1* | 3/2017 | Wexler | G06F 16/9535 |
| 2017/0140757 | A1* | 5/2017 | Penilla | G10L 25/63 |
| 2017/0154210 | A1* | 6/2017 | Li | G06K 9/00664 |
| 2017/0206064 | A1* | 7/2017 | Breazeal | G06F 8/36 |
| 2017/0213190 | A1* | 7/2017 | Hazan | G06Q 10/1053 |
| 2017/0287481 | A1* | 10/2017 | Bhat | G10L 25/81 |
| 2017/0364484 | A1* | 12/2017 | Hayes | G06F 40/109 |
| 2018/0004481 | A1* | 1/2018 | Fallon | G09G 5/00 |
| 2018/0077095 | A1* | 3/2018 | Deyle | G10L 25/63 |
| 2018/0084022 | A1* | 3/2018 | Newell | H04N 21/252 |
| 2018/0093185 | A1* | 4/2018 | Black | G06K 9/00315 |
| 2018/0122371 | A1* | 5/2018 | Vangala | G06F 40/295 |
| 2018/0130459 | A1* | 5/2018 | Paradiso | G06T 13/00 |
| 2018/0133900 | A1* | 5/2018 | Breazeal | B25J 19/026 |
| 2018/0144746 | A1* | 5/2018 | Mishra | G10L 15/25 |
| 2018/0168498 | A1* | 6/2018 | Bernstein | A61B 5/165 |
| 2018/0174055 | A1* | 6/2018 | Tirumale | G06Q 10/10 |
| 2018/0196432 | A1* | 7/2018 | Krupat | A61B 5/165 |
| 2018/0204570 | A1* | 7/2018 | Puranik | B60K 37/06 |
| 2018/0250815 | A1* | 9/2018 | Stein | B25J 9/1658 |
| 2018/0277093 | A1* | 9/2018 | Carr | G10L 13/00 |
| 2018/0293312 | A1* | 10/2018 | Tateossian | G06F 16/735 |
| 2018/0357526 | A1* | 12/2018 | Numata | G10L 13/027 |
| 2018/0366121 | A1* | 12/2018 | Funazukuri | B25J 11/0005 |
| 2019/0012599 | A1* | 1/2019 | el Kaliouby | G06N 3/084 |
| 2019/0027142 | A1* | 1/2019 | Iwanami | H04L 67/04 |
| 2019/0033957 | A1* | 1/2019 | Shionozaki | G10L 17/22 |
| 2019/0073547 | A1* | 3/2019 | el Kaliouby | G06K 9/00302 |
| 2019/0074028 | A1* | 3/2019 | Howard | G10L 25/27 |
| 2019/0087870 | A1* | 3/2019 | Gardyne | G06Q 30/0276 |
| 2019/0095775 | A1* | 3/2019 | Lembersky | G06N 3/008 |
| 2019/0103102 | A1* | 4/2019 | Tseretopoulos | H04L 51/02 |
| 2019/0103127 | A1* | 4/2019 | Tseretopoulos | G06F 40/247 |
| 2019/0108834 | A1* | 4/2019 | Nelson | G10L 15/22 |
| 2019/0118386 | A1* | 4/2019 | Okumura | H04R 1/025 |
| 2019/0187870 | A1* | 6/2019 | Bostick | G06F 3/167 |
| 2019/0266999 | A1* | 8/2019 | Chandrasekaran | G09B 5/00 |
| 2019/0308327 | A1* | 10/2019 | Wolford | G10L 15/26 |
| 2019/0320143 | A1* | 10/2019 | Izumihara | H04N 7/157 |
| 2020/0089938 | A1* | 3/2020 | Reznicek | G06K 9/00221 |
| 2020/0092339 | A1* | 3/2020 | Rakshit | G10L 21/003 |
| 2020/0114521 | A1* | 4/2020 | Mahoor | B25J 13/003 |
| 2020/0135050 | A1* | 4/2020 | Monge Nunez | G06N 20/00 |
| 2020/0135226 | A1* | 4/2020 | Mittal | H04L 51/10 |
| 2021/0191506 | A1* | 6/2021 | Wang | G06N 3/0454 |
| 2021/0201696 | A1* | 7/2021 | Perez | G09B 5/065 |
| 2021/0279668 | A1* | 9/2021 | Mikhajlov | A61B 5/1128 |

* cited by examiner

| ID ³⁰¹ | SIGNAL NAME ³⁰² | OBTAINING TIME ³⁰³ | POINTER ³⁰⁴ |
|---|---|---|---|
| D1 | IMAGE SIGNAL | 0.03 | xxx.xxx.xxx |
| D2 | VOICE SIGNAL | 0.03 | xxx.xxx.yyy |
| D3 | IMAGE SIGNAL | 0.06 | xxx.xxx.zzz |
| ⋮ | ⋮ | ⋮ | ⋮ |

*FIG. 3*

| ID ⁴⁰¹ | REFERENCE ID ⁴⁰² | INTERACTION FEATURE VALUE TYPE ⁴⁰³ | INTERACTION FEATURE VALUE ⁴⁰⁴ |
|---|---|---|---|
| DF1 | D1,D3 | LINE OF SIGHT | (10,168) |
| DF2 | D1,D3 | FACIAL ORIENTATION | 134 |
| DF3 | D1,D3 | BODY MOVEMENT | 65 |
| DF4 | D1,D3 | FACIAL EXPRESSION | JOY |
| DF5 | D2 | SPEECH AMOUNT | 20 |

*FIG. 4*

| ID ⁵⁰¹ | REFERENCE ID ⁵⁰² | EMPATHY FEATURE VALUE TYPE ⁵⁰³ | EMPATHY FEATURE VALUE ⁵⁰⁴ |
|---|---|---|---|
| EF1 | DF5 | EASE OF TALKING | 35 |
| EF2 | DF4 | FUN | 20 |

*FIG. 5*

| INPUT SPEECH CONTENT | REFERENCE ID |
|---|---|
| WHAT IS TODAY'S DATE? | D2,... |

FIG. 6

| ID | EMPATHY FEATURE VALUE TYPE | LISTENING PATTERN | |
|---|---|---|---|
| L1 | EASE OF TALKING | LINE OF SIGHT | 1 |
| | | FACIAL EXPRESSION | 1.1 |
| | | NODDING | 0.3 |
| | | LINE OF SIGHT MOVEMENT SOUND | 1 |
| | | EMOTIONAL VOICE | 1 |
| | | BACKCHANNEL FEEDBACK | 0.2 |
| L2 | FUN | LINE OF SIGHT | 1 |
| | | FACIAL EXPRESSION | 0.2 |
| | | NODDING | 1 |
| | | LINE OF SIGHT MOVEMENT SOUND | 1.3 |
| | | EMOTIONAL VOICE | 0 |
| | | BACKCHANNEL FEEDBACK | 1 |

FIG. 7

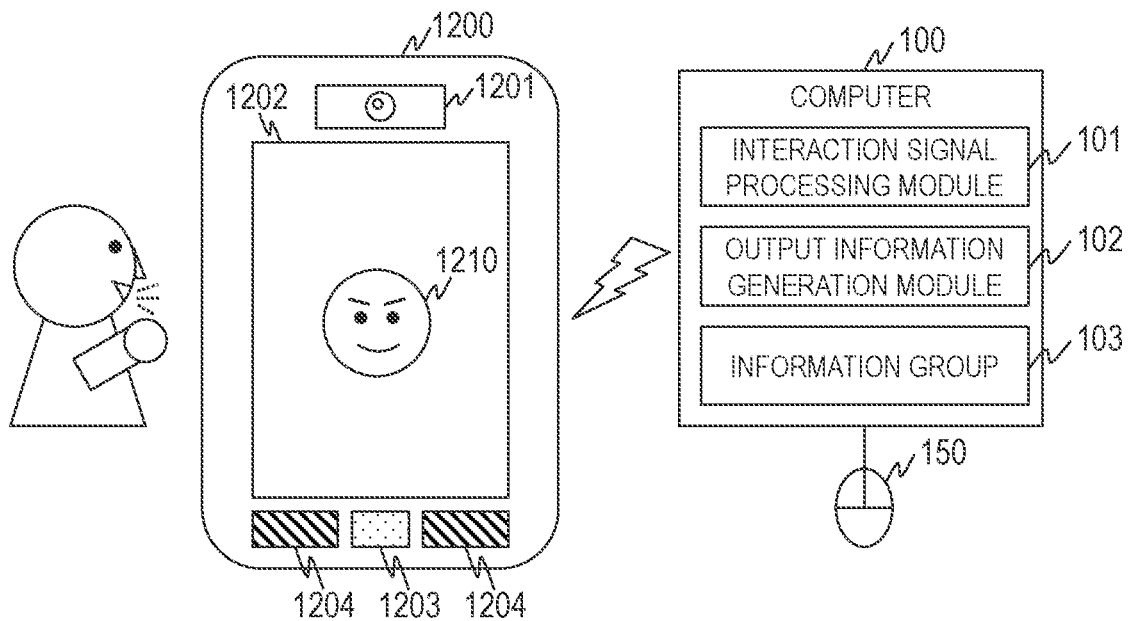
FIG. 12
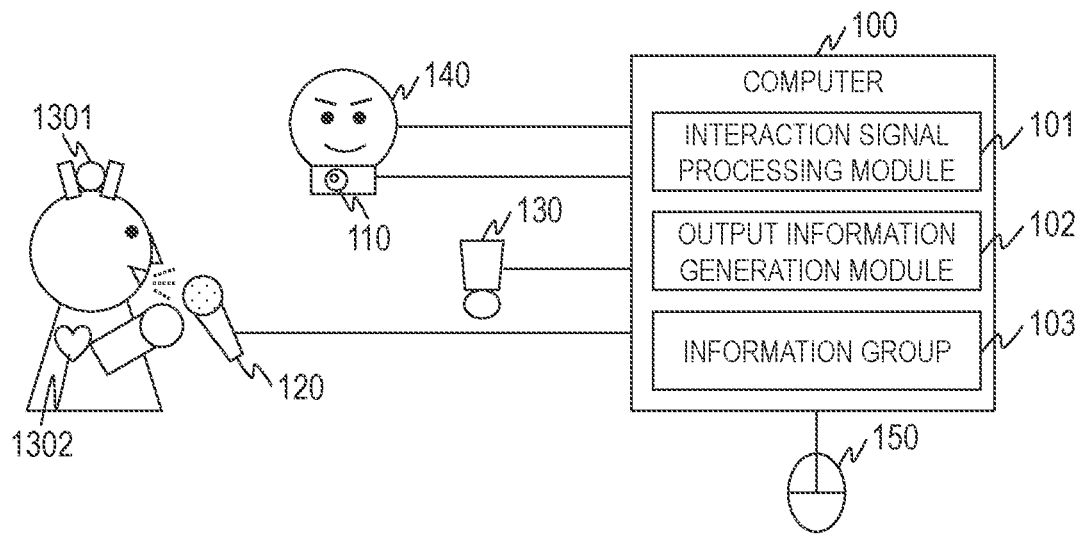
FIG. 13
| ID | SIGNAL NAME | OBTAINING TIME | POINTER |
|---|---|---|---|
| B1 | ELECTROCARDIOGRAM | 0.1 | zzz.zzz.zzz |
| ⋮ | ⋮ | ⋮ | ⋮ |
FIG. 14

1700

1710 — INTERACTION FEATURE VALUE: 3 — 1711

1712
- ● INTERACTION FEATURE VALUE 1
- ● INTERACTION FEATURE VALUE 2
- ● INTERACTION FEATURE VALUE 3

1713

| INTERACTION SIGNAL TYPE | INTERACTION FEATURE VALUE TYPE |
|---|---|
| EYE IMAGE | LINE OF SIGHT |
| FACIAL IMAGE | FACIAL EXPRESSION |
| VOICE | SPEECH AMOUNT |

1720 — EMOTION FEATURE VALUE: 3 — 1721

1722
- ● EMOTION FEATURE VALUE 1
- ● EMOTION FEATURE VALUE 2

1723

| EMOTION SIGNAL TYPE | EMOTION FEATURE VALUE TYPE |
|---|---|
| ELECTROCARDIOGRAM | LINE OF SIGHT |
| BRAIN WAVE | P300 AMPLITUDE |

1730 — EMPATHY FEATURE VALUE: 2 — 1731

1732
- ● EMPATHY FEATURE VALUE 1
- ● EMPATHY FEATURE VALUE 2

1733

| EMPATHY FEATURE VALUE TYPE | FEATURE VALUE TYPE |
|---|---|
| EASE OF TALKING | SPEECH AMOUNT |
| FUN | FACIAL EXPRESSION |

1740 — LISTENING PATTERN: 2 — 1741

1742
- ● LISTENING PATTERN1
- ● LISTENING PATTERN2

1743

| CONTROL ITEM1 | CONTROL ITEM2 | |
|---|---|---|
| EASE OF TALKING | LINE OF SIGHT;1 | [+] |
| FUN | LINE OF SIGHT;1 | [+] |

1750 — LEARNING DATA: HISTORY DATA — 1751

- ● LEARNING DATA PRESENT    ○ LEARNING DATA ABSENT
  - ○ NEW LEARNING DATA
  - ● HISTORY DATA

1760 — SELECT LISTENING PATTERN

[ MINIMUM VALUE ▼ ]

1770 — [ SAVE ]

*FIG. 17*

INTERACTION SYSTEM, APPARATUS, AND NON-TRANSITORY COMPUTER READABLE STORAGE MEDIUM

CLAIM OF PRIORITY

The present application claims priority from Japanese patent application JP 2018-211609 filed on Nov. 9, 2018, the content of which is hereby incorporated by reference into this application.

BACKGROUND OF THE INVENTION

The present invention relates to an interaction system that realizes interaction with a user through an interaction interface.

If an interaction interface such as a robot or CG that interacts with a person can evoke empathy in the person by giving responses that indicate attentive listening to utterances by the person, then this increases the person's willingness to talk, resulting in a continuous interaction.

The interaction interface obtains, as an interaction signal, information relating to the behavior of the person during the interaction such as facial expressions, tone of voice, and the like of the person, calculates feature values from the interaction signal (interaction feature values), and determines the facial expression and tone of voice to be outputted via the interaction interface on the basis of the interaction feature values to realize interaction that evokes empathy in the person.

One known technique relating to an interaction interface is the technique disclosed in JP 2012-181697 A. JP 2012-181697 A discloses an interaction system in which "an interaction state quantity calculation unit detects interaction state quantities including speaker switching pauses, and the pitch, power, or morae of an interaction interval during an utterance by the user. A communication synchronization control unit calculates a communication synchronization offset quantity between the user and the robot system and minimizes the communication synchronization offset quantity by continuous entrainment control by a state formula representing a synchronization model, while at the same time performing discrete entrainment control by interaction rules, thereby causing the interaction state quantity of the user to approach that of the robot system, or causing the interaction state quantity of the robot system to approach the interaction state quantity of the user while causing the interaction state quantity of the user to approach that of the robot system."

The interaction system disclosed in JP 2012-181697 A realizes continuous communication by minimizing the offset in interaction state quantities.

SUMMARY OF THE INVENTION

However, as a result of experiments performed by the inventor, it was found that even if the interaction interface (dialogue robot) were to emulate the user in order to minimize the offset quantity, there are cases in which the user's empathy cannot be increased. Specifically, it was found that by the dialogue robot outputting a nodding gesture in response to the user's utterance, the speech quantity by the user could be increased, but that this reduced smiles by the user. Thus, the interaction system disclosed in JP 2012-181697 A cannot always evoke empathy in the user.

FIG. 18A is a graph that evaluates the relationship between the number of nods by the dialogue robot and the number of smiles by the user.

The horizontal axis represents the number of nods by the dialogue robot. The vertical axis represents the change in the number of smiles by the user. This change is calculated as a value (difference) attained by subtracting the number of smiles by the user when the dialogue robot did not output a nodding gesture in response to the user's utterance from the number of smiles by the user when the dialogue robot outputted the nodding gesture in response to the user's utterance.

As shown in FIG. 18A, the inventor confirmed that there is a significant negative correlation between the number of nods by the dialogue robot and the number of smiles by the user; that is, if the number of nods by the dialogue robot is high, the number of smiles by the user tends to decrease.

FIG. 18B is a graph that evaluates the relationship between the number of nods by the dialogue robot and the duration of smiles by the user.

The horizontal axis represents the number of nods by the dialogue robot. The vertical axis represents the duration of smiles by the user.

As shown in FIG. 18B, the inventor confirmed that there is a significant negative correlation between the number of nods by the dialogue robot and the duration of smiles by the user; that is, if the number of nods by the dialogue robot is high, the duration of smiles by the user tends to decrease.

According to these experiment results, it was found that the dialogue robot outputting a nodding gesture in response to the user's utterance has the effect of reducing smiles by the user.

In order to effectively evoke empathy in the user, it is necessary not only to encourage utterances and increase the ease of talking for the user, but also to increase the fun of talking. It is preferable that the output of the interaction interface be controlled in consideration of a plurality of feature values (empathy feature values) that affect a person's empathy such as the ease of talking and the fun of talking.

An object of the present invention is to provide a feature for realizing an interaction interface that effectively evokes empathy in a person.

A representative example of the present invention disclosed in this specification is as follows: an interaction system provides an interaction interface that interacts with a user. The interaction system comprises: a computer having an arithmetic device, a storage device coupled to the arithmetic device, and a connecting device that is coupled to the arithmetic device; and an information obtaining device configured to obtain information relating to a state of the user. The storage device stores listening pattern definition information for managing data in which a type of a second feature value that is an index representing a degree of empathy by the user towards the interaction interface is associated with a listening pattern that defines a tendency of a response action performed by the interaction interface on the user. The arithmetic device is configured to: calculate at least one first feature value that is an index for evaluating a change in state during speech by the user on the basis of information obtained by the information obtaining device; calculate a plurality of second feature values on the basis of the at least one first feature value; select a target second feature value from among the plurality of second feature values; select the listening pattern corresponding to the target second feature value with reference to the listening pattern definition information; generate output information for controlling the interaction interface on the basis of the at least one first feature value and the selected listening pattern; and control the interaction interface on the basis of the output information.

According to one aspect of the present invention, it is possible to evoke empathy in the user and realize continuous interaction. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 3 shows an example of a data structure of interaction signal information of Embodiment 1;

FIG. 4 shows an example of a data structure of interaction feature value information of Embodiment 1;

FIG. 5 shows an example of a data structure of empathy feature value information of Embodiment 1;

FIG. 6 shows an example of a data structure of speech information of Embodiment 1;

FIG. 7 shows an example of a data structure of listening pattern definition information of Embodiment 1;

FIG. 12 shows a configuration example of an interaction system according to Modification Example 1 of Embodiment 1;

FIG. 13 shows a configuration example of an interaction system of Embodiment 2;

FIG. 14 shows an example of a data structure of emotion signal information stored by a computer of Embodiment 2;

FIG. 17 shows an example of a GUI for configuring settings of the computer of Embodiments 1 and 2;

DETAILED DESCRIPTION OF EMBODIMENTS

Figure 1:
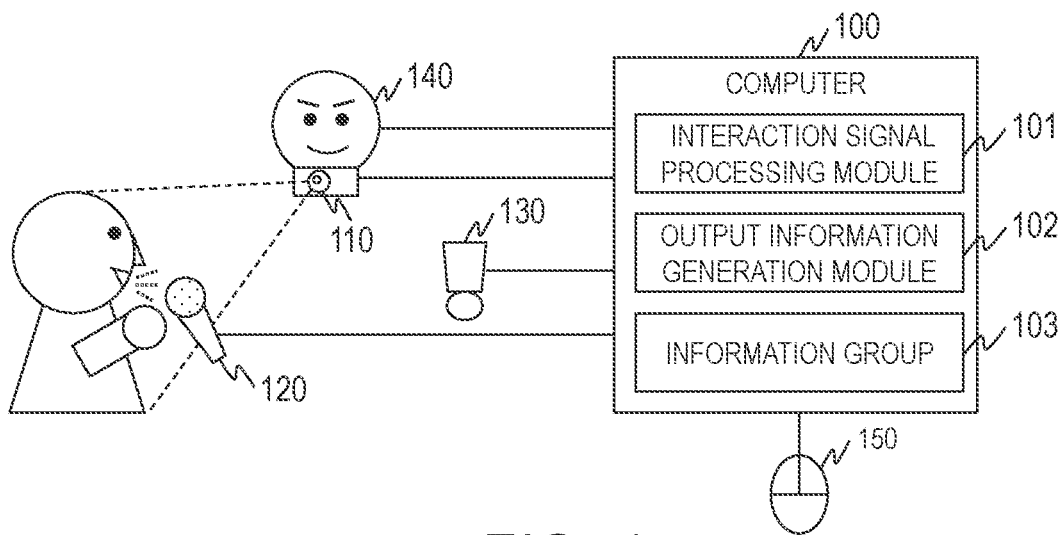
FIG. 1 shows a configuration example of an interaction system of Embodiment 1.

Now, a description is given of an embodiment of this invention referring to the drawings. It should be noted that this invention is not to be construed by limiting the invention to the content described in the following embodiment. A person skilled in the art would easily recognize that a specific configuration described in the following embodiment may be changed within the scope of the concept and the gist of this invention.

In a configuration of this invention described below, the same or similar components or functions are assigned with the same reference numerals, and a redundant description thereof is omitted here.

Notations of, for example, "first", "second", and "third" herein are assigned to distinguish between components, and do not necessarily limit the number or order of those components.

The position, size, shape, range, and others of each component illustrated in, for example, the drawings may not represent the actual position, size, shape, range, and other metrics in order to facilitate understanding of this invention. Thus, this invention is not limited to the position, size, shape, range, and others described in, for example, the drawings.

Embodiment 1

In Embodiment 1, a computer that provides an interaction interface that interacts with a user calculates interaction feature values on the basis of an interaction signal (interaction information) and calculate empathy feature values on the basis of the interaction feature values. Also, the computer selects a listening pattern on the basis of the empathy feature values, and generates output information that defines control content of the interaction interface on the basis of the listening pattern and the interaction feature values. The interaction interface performs a response action such as a prescribed utterance or action on the basis of the output information.

Here, terminology used in Embodiment 1 will be explained.

The "interaction signal" is a signal including information relating to the user's behavior during an interaction (information on the user's state that can be seen from the outside). This is information relating to the user such as an image of the eyes, face, body, environment surrounding the user, or the like, the voice of the user, the acceleration of a part of the user's body, and the diameter of the pupils of the user's eyes. In Embodiment 1, three types of information including an eye image, a facial image, and the voice of the user are obtained as the interaction signal.

The "interaction feature values" are indices for evaluating the behavior of the user that are calculated on the basis of the interaction signal (index for evaluating changes in the user that can be seen from the outside). For example, the line of sight, facial expression, speech quantity, and the like of the user are calculated as interaction feature values.

The "empathy feature values" are indices for evaluating the degree of empathy by the user towards the interaction interface. In Embodiment 1, a value indicating ease of talking and a value indicating fun of talking are calculated as empathy feature values.

The "listening pattern" is a pattern indicating listening by the interaction interface. Here, "listening by the interaction interface" represents the tendencies regarding the response action by the interaction interface. In Embodiment 1, two types of listening patterns are set: an active listening pattern and a passive listening pattern. As will be described later, the computer selects the listening pattern on the basis of the empathy feature values. The "active listening pattern" is a listening pattern aimed at increasing the "ease of talking" by the user towards the interaction interface. The "passive listening pattern" is a listening pattern aimed at increasing the "fun" for the user of the interaction interface.

The "response action" is an action that the interaction interface performs towards the user, and includes motions, utterances, and the like by a humanoid image displayed by a display device or a robot that constitutes the interaction interface.

FIG. 1 shows a configuration example of an interaction system of Embodiment 1.

The interaction system is constituted of a computer 100, interaction signal obtaining devices 110 and 120, and interaction output devices 130 and 140.

The computer 100 generates output information 216 (see FIG. 2) using the interaction signal, and controls the interaction output devices 130 and 140 on the basis of the output information 216. The computer 100 is connected to an input device 150 such as a mouse, keyboard, or touch panel.

The interaction output devices 130 and 140 are devices that function as interaction interfaces. In Embodiment 1, the interaction output device 130 is a speaker that plays back a voice, and the interaction output device 140 is a robot that performs a prescribed action. The interaction output devices 130 and 140 may be realized as one device.

The interaction signal obtaining devices 110 and 120 are devices that obtain interaction signals. Specifically, the interaction signal obtaining device 110 obtains an image as the interaction signal and the interaction signal obtaining device 120 obtains the voice as the interaction signal.

If a plurality of interaction signal obtaining devices that obtain the same type of interaction signal are included in the interaction system, the interaction signal may include identification information of the interaction signal obtaining devices.

An angle sensor and an acceleration sensor worn by the user may be used as interaction signal obtaining devices. Values obtained by the sensors can be used in order to calculate the orientation of the face and body movements.

The input device 150 is a device for inputting external signals. Here, external signals are signals for controlling the computer 100 and are handled as external signals that exclude the interaction signals.

A summary of the software configuration of the computer 100 will be explained below. The computer 100 has an interaction signal processing module 101 and an output information generation module 102, and stores an information group 103. The computer 100 may have a module that realizes the function of displaying information stored by the computer 100 and information generated by the computer 100.

The interaction signal processing module 101 calculates various information used for generating the output information 216. Specifically, the process below is executed.

The interaction signal processing module 101 calculates interaction data from the interaction signals and calculates the interaction feature values on the basis of the interaction data. The interaction signal processing module 101 calculates the empathy feature values on the basis of the interaction feature values. The algorithm for calculating the interaction feature values on the basis of the interaction data and the algorithm for calculating the empathy feature values on the basis of the interaction feature values are set in advance.

The relationship between the interaction feature values and the empathy feature values may be determined by executing a learning process using results of opinion surveys or the like to the user. In such a case, a learning module that executes machine learning would be added to causes the computer 100, and a database used for the learning process would be prepared. The database stores data that associates the interaction feature values with the empathy feature values. If the quantity of data in the database is less than what is necessary for the learning process, the interaction system may have a function of instructing the user in order to gather or create data.

The interaction signal processing module 101 selects the listening pattern on the basis of the empathy feature values. The algorithm for selecting the listening pattern on the basis of the empathy feature values is set in advance. Also, the interaction signal processing module 101 analyzes the speech content of the user on the basis of the interaction data, and determines the speech content to be outputted from the interaction interface on the basis of the analysis results. The algorithm that determines the speech content to be outputted from the interaction interface is set in advance.

The output information generation module 102 generates the output information 216 on the basis of the interaction feature values, the speech content, and the listening pattern, and controls the interaction interface on the basis of the output information 216.

The present invention is not limited to the use of an algorithm that calculates the interaction feature values on the basis of the interaction data. The algorithm may be one that calculates one type of interaction feature value on the basis of one type of interaction data, one that calculates one type of interaction feature value on the basis of a plurality of types of interaction data, or one that calculates a plurality of types of interaction feature values on the basis of one type of interaction data.

The present invention is not limited to the use of an algorithm that calculates the empathy feature values. The algorithm may be one that calculates one type of empathy feature value on the basis of one type of interaction feature value, one that calculates one type of empathy feature value on the basis of a plurality of types of interaction feature values, or one that calculates a plurality of types of empathy feature values on the basis of one type of interaction feature value.

The present invention is not limited to the use of an algorithm that selects a listening pattern. The algorithm may be one that selects a listening pattern on the basis of one type of empathy feature value or one that selects a listening pattern on the basis of a plurality of types of empathy feature values. One conceivable type of algorithm is one that selects a listening pattern for increasing the smallest empathy feature value.

The present invention is not limited to an algorithm that determines the speech content to be outputted from the interaction interface.

In FIG. 1, one computer 100 has multiple modules, but each module may be disposed in each of a plurality of computers. Also, in FIG. 1, the interaction signal obtaining devices 110 and 120 and the computer 100 are depicted as separate devices, but the computer 100 may include the interaction signal obtaining devices 110 and 120.

The modules of the computer 100 may be configured such that two or more modules are consolidated into one module, or such that one module is divided into a plurality of modules for each function.

Figure 2:
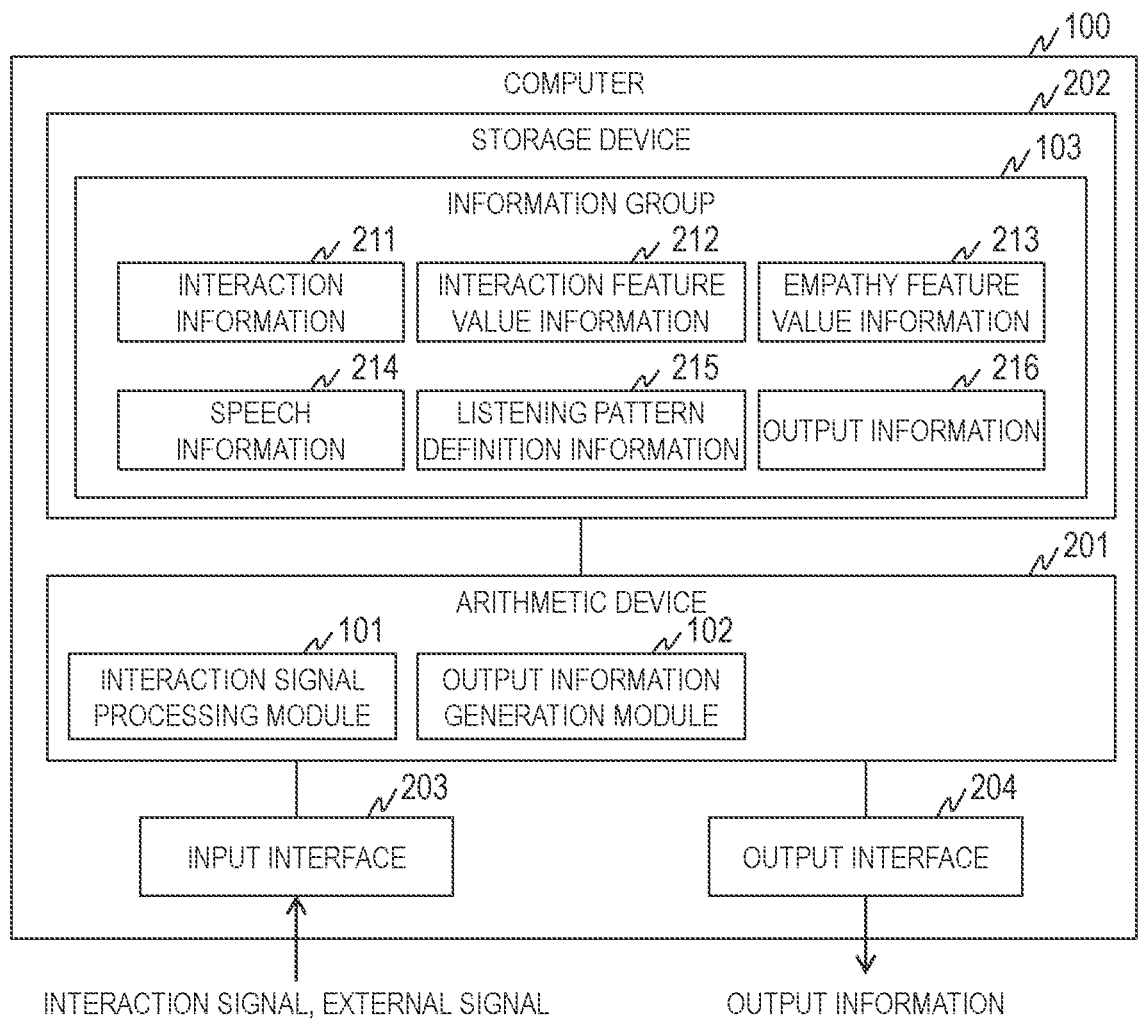
FIG. 2 is a diagram for describing a configuration example of a computer of Embodiment 1.

FIG. 2 is a diagram for describing a configuration example of the computer 100 of Embodiment 1.

The computer 100 has an arithmetic device 201, a storage device 202, an input interface 203, and an output interface 204.

The arithmetic device 201 is a piece of hardware such as a CPU (central processing unit) or a GPU (graphics processing unit) and executes programs stored in the storage device 202. The arithmetic device 201 functions as prescribed modules by operating according to the programs. In the present embodiment, the arithmetic device 201 functions as the interaction signal processing module 101 and the output information generation module 102.

The storage device 202 is a piece of hardware such as memory, and stores programs to be executed by the arithmetic device 201 and information to be used by the programs. Also, the storage device 202 includes a work area. The programs and information stored in the storage device 202 will be described later. The computer 100 may have a storage device such as an HDD (hard disk drive) or an SSD (solid state drive).

The input interface 203 is hardware that receives input of the interaction signal and the external signal. If connecting to a device that inputs signals through a USB (Universal Serial Bus) connecting line, then an interface having the USB terminal is the input interface 203, and if connecting to a device that inputs signals through a network, then an interface having a port is the input interface 203.

The output interface 204 is hardware that outputs various information. If the device outputting information is a display, then an interface having a terminal such as a VGA terminal or an HDMI (registered trademark) terminal is the output interface 204, and if the device outputting information is a speaker, then an interface having a USB terminal is the output interface 204.

Here, the programs and information stored in the storage device 202 will be described. The storage device 202 stores programs for realizing the interaction signal processing module 101 and the output information generation module 102. Also, the storage device 202 stores interaction signal information 211, interaction feature value information 212, empathy feature value information 213, speech information 214, listening pattern definition information 215, and output information 216.

The interaction signal information 211 is information for managing interaction signals. An example of a data structure of the interaction signal information 211 is described with reference to FIG. 3. The interaction feature value information 212 is information for managing interaction feature values. An example of a data structure of the interaction feature value information 212 is described with reference to FIG. 4. The empathy feature value information 213 is information for managing empathy feature values. An example of a data structure of the empathy feature value information 213 is described with reference to FIG. 5. The speech information 214 is information for managing speech content of a person. An example of a data structure of the speech information 214 is described with reference to FIG. 6. The listening pattern definition information 215 is information for managing listening patterns. An example of a data structure of the listening pattern definition information 215 is described with reference to FIG. 7. The output information 216 is information for controlling the interaction interface. An example of a data structure of the output information 216 is described with reference to FIG. 8.

FIG. 3 shows an example of a data structure of the interaction signal information 211 of Embodiment 1.

The interaction signal information 211 includes entries constituted of an ID 301, a signal name 302, an obtaining time 303, and a pointer 304. Each entry corresponds to one interaction signal. The structure of the aforementioned entries is just one example and is not limited thereto. Some of the fields may be omitted, and other fields may be included.

The ID 301 is a field that stores identification information for uniquely identifying the entries of the interaction signal information 211.

The signal name 302 is a field that stores information indicating the type of interaction signal. "Image signal" or the like is stored under the signal name 302, for example. If interaction signal obtaining devices that obtain the same type of interaction signal are included in the interaction system, the signal name 302 may store a value that identifies which of the interaction signal obtaining devices obtained the interaction signal.

The obtaining time 303 is a field that stores the obtaining time of the interaction signal. The obtaining time 303 stores a time based on the start time for obtaining the interaction signal, for example.

The pointer 304 is a field that stores a pointer to a storage region in which the obtained interaction signal is stored.

A field that stores the obtained interaction signal may be provided instead of the pointer 304. Such a field would store an image, a voice, or the like, for example. The field may store a combination of coordinates and RGB values attained by converting an image, and a voice or the like on which normalization or the like was performed.

A plurality of signals may be extracted from the interaction signal. If the interaction signal is an image, for example, then an eye image, a facial image, or the like may be extracted from the image, with an entry of each image added to the interaction signal information 211. The eye image and the facial image may be extracted on the basis of feature values relating to the eyes and the face, on the basis of a statistical process using feature values of the image, or by inputting feature values of the image to a discriminator.

FIG. 4 shows an example of a data structure of the interaction feature value information 212 of Embodiment 1.

The interaction feature value information 212 includes entries constituted of an ID 401, a reference ID 402, an interaction feature value type 403, and an interaction feature value 404. Each entry corresponds to one interaction feature value. The structure of the aforementioned entries is just one example and is not limited thereto. Some of the fields may be omitted, and other fields may be included.

The ID 401 is a field that stores identification information for uniquely identifying the entries of the interaction feature value information 212.

The reference ID 402 is a field that stores identification information of the interaction signal used when calculating the interaction feature value. The reference ID 402 stores the value of the ID 301.

The interaction feature value type 403 is a field that stores information indicating the type of interaction feature value. For example, the interaction feature value type 403 stores "line of sight", "facial orientation", "body movement", "facial expression", "amount of speech", or the like. The interaction feature value has set thereto an identification number separate from the type.

The interaction feature value 404 is a field that stores the calculated interaction feature value.

If the interaction feature value type 403 is "line of sight", then the coordinates or the like of the user's line of sight are stored as the interaction feature value 404, if the interaction feature value type 403 is "facial orientation", the inclination angle or the like of the user's face is stored as the interaction feature value 404, and if the interaction feature value type 403 is "body movement", then the amount of movement of the user's body or the like is stored as the interaction feature value 404.

The coordinates of the user's line of sight may be set such that an arbitrary reference point in space is set as the origin, or the location where the interaction output device 140 is disposed is set as the origin. The inclination angle of the face is calculated on the basis of the change in distance between feature points calculated from the tip of the nose and the facial contour, the left/right difference, or the like. The amount of movement of the body per unit time is calculated on the basis of the total movement distance of feature points calculated from the contour of the body, or the like.

If the interaction feature value type 403 is "facial expression", then the interaction feature value 404 stores the type of facial expression of the user such as joy, sorrow, anger, surprise, or the like. Facial expressions of the user can be calculated on the basis of the degree of similarity between an image of the user's facial expressions prepared in advance and an obtained image of the user's facial expression. The type of facial expression of the user can be calculated on the basis of the change in the positions of feature points such as the eyes, mouth, contour, and the like, the change in distance between the feature points, or the like.

If the interaction feature value type 403 is "amount of speech", then the interaction feature value 404 stores the amount of speech energy or the like per unit time. The amount of speech energy per unit time can be calculated using the square sum of values such as the sound volume per unit time of the user's voice. The speed of speech, the speech rhythm, and the like may be calculated as interaction feature values. Also, the interaction feature values may be calculated on the basis of words, expressions, and the like included in the speech content.

The calculated interaction feature values are not limited to those used for calculating the empathy feature values. Interaction feature values used for determining the response action may be calculated.

In order to compare the interaction feature values, a normalized value with a minimum value of 0 and a maximum value of 100 may be stored as the interaction feature values 404.

FIG. 5 shows an example of a data structure of the empathy feature value information 213 of Embodiment 1.

The empathy feature value information 213 includes entries constituted of an ID 501, a reference ID 502, an empathy feature value type 503, and an empathy feature value 504. Each entry corresponds to one empathy feature value. The structure of the aforementioned entries is just one example and is not limited thereto. Some of the fields may be omitted, and other fields may be included.

The ID 501 is a field that stores identification information for uniquely identifying the entries of the empathy feature value information 213.

The reference ID 502 is a field that stores identification information of the interaction feature value when calculating the empathy feature value. The reference ID 502 stores the value of the ID 401.

The empathy feature value type 503 is a field that stores information indicating the type of empathy feature value. The empathy feature value type 503 of the present embodiment has stored therein either one of "ease of talking" and "fun". The empathy feature value has set thereto an identification number separate from the type.

The empathy feature value 504 is a field that stores the calculated empathy feature value.

Methods for calculating empathy feature values include a method in which the interaction feature values are calculated as the empathy feature values, and a calculation method based on a calculation formula defined by an expert. For example, if the empathy feature value type 503 is "ease of talking", then the empathy feature value is calculated on the basis of the amount of speech, and if the empathy feature value type 503 is "fun", then the empathy feature value is calculated on the basis of facial expressions.

Also, one method for calculating the empathy feature value using a plurality of interaction feature values is a method in which the sum of the interaction feature values or the average of normalized interaction feature values is calculated as the empathy feature value. For example, a first primary component attained from primary component analysis of a plurality of interaction feature values is calculated as the empathy feature value of "ease of talking" and a second primary component is calculated as the empathy feature value of "fun".

In order to compare the empathy feature values, a normalized value with a minimum value of 0 and a maximum value of 100 may be stored as the empathy feature values 504.

FIG. 6 shows an example of a data structure of the speech information 214 of Embodiment 1.

The speech information 214 includes entries constituted of input speech content 601 and a reference ID 602. Each entry corresponds to speech content of the user. The structure of the aforementioned entries is just one example and is not limited thereto. Some of the fields may be omitted, and other fields may be included.

The input speech content 601 is a field for storing the speech content of the user identified by analyzing the interaction signal relating to the voice.

The reference ID 602 is a field that stores identification information of the interaction signal used for identifying the speech content. The reference ID 602 stores the value of the ID 301.

FIG. 7 shows an example of a data structure of the listening pattern definition information 215 of Embodiment 1.

The listening pattern definition information 215 includes entries constituted of an ID 701, an empathy feature value type 702, and a listening pattern 703. Each entry corresponds to a group including one empathy feature value and a listening pattern. The structure of the aforementioned entries is just one example and is not limited thereto. Some of the fields may be omitted, and other fields may be included.

The ID 701 is a field that stores identification information for uniquely identifying the entries of listening pattern definition information 215.

The empathy feature value type 702 is a field that stores identification information of the empathy feature value serving as a selection reference for the listening pattern.

The listening pattern 703 is a field for storing listening patterns. The listening pattern of Embodiment 1 is constituted of a group including a control item and an adjusted value for a response action by the interaction interface.

The combination of empathy feature value and listening pattern may be determined by an expert or determined by machine learning based on an algorithm such as logistic regression analysis using a history or a support vector machine. Also, the combination of control item and adjusted value in the listening pattern may be determined by an expert or based on machine learning using a history.

In a case of determining the aforementioned combination on the basis of machine learning, a learning module that executes machine learning would be added to the computer 100, and a database used for machine learning would be prepared. The database stores data that associates the listening pattern with the amount of change in empathy feature value. The amount of change in empathy feature value can be calculated by taking the difference of the empathy feature values before and after the response process based on the output information 216 using the listening pattern.

If the quantity of data in the database is less than what is necessary for the learning process, the interaction system may have a function of instructing the user in order to gather or create data. The interaction system may, for example, instruct the user to recall interactions that have occurred in the past, and apply a visual stimulus, an auditory stimulus, an olfactory stimulus, or the like to the user in order to change a specific empathy feature value to obtain data relating to the listening pattern and the change in empathy feature value.

By executing a learning process for each user, it is also possible to generate a listening pattern for each user.

By using the listening pattern definition information 215 generated by machine learning, it is possible to effectively evoke empathy in the user and realize a more continuous interaction with much information.

Figure 8:
FIG. 8 shows an example of a data structure of output information of Embodiment 1.

FIG. 8 shows an example of a data structure of the output information 216 of Embodiment 1.

The output information 216 includes entries constituted of an output device 801, a control item 802, and a control value 803. Each entry corresponds to one response action. The structure of the aforementioned entries is just one example and is not limited thereto. Some of the fields may be omitted, and other fields may be included.

The output device 801 is a field for storing the identification information of the interaction output devices 130 and 140, which perform the response action. In Embodiment 1, the interaction output device 140 is controlled on the basis of the interaction feature value and the listening pattern, and the interaction output device 130 is controlled on the basis of the speech content.

The control item 802 is a field for storing a value indicating the item to be controlled in the interaction interface during a response action. For example, if the line of sight of a robot is the item to be controlled, then the control item 802 stores "eyes", if the facial expression of the robot is the item to be controlled, then the control item 802 stores "facial expression", if the output of a voice from the speaker is the item to be controlled, then the control item 802 stores "speech content", and if the tone of voice outputted from the speaker is the item to be controlled, then the control item 802 stores "tone of voice". Other possible control items include the speed, rhythm, and the like of speech.

The control value 803 is a field that stores a value for controlling the item to be controlled in the interaction interface that corresponds to the control item 802.

A response action for outputting a voice according to line of sight movement may be performed.

Figure 9:
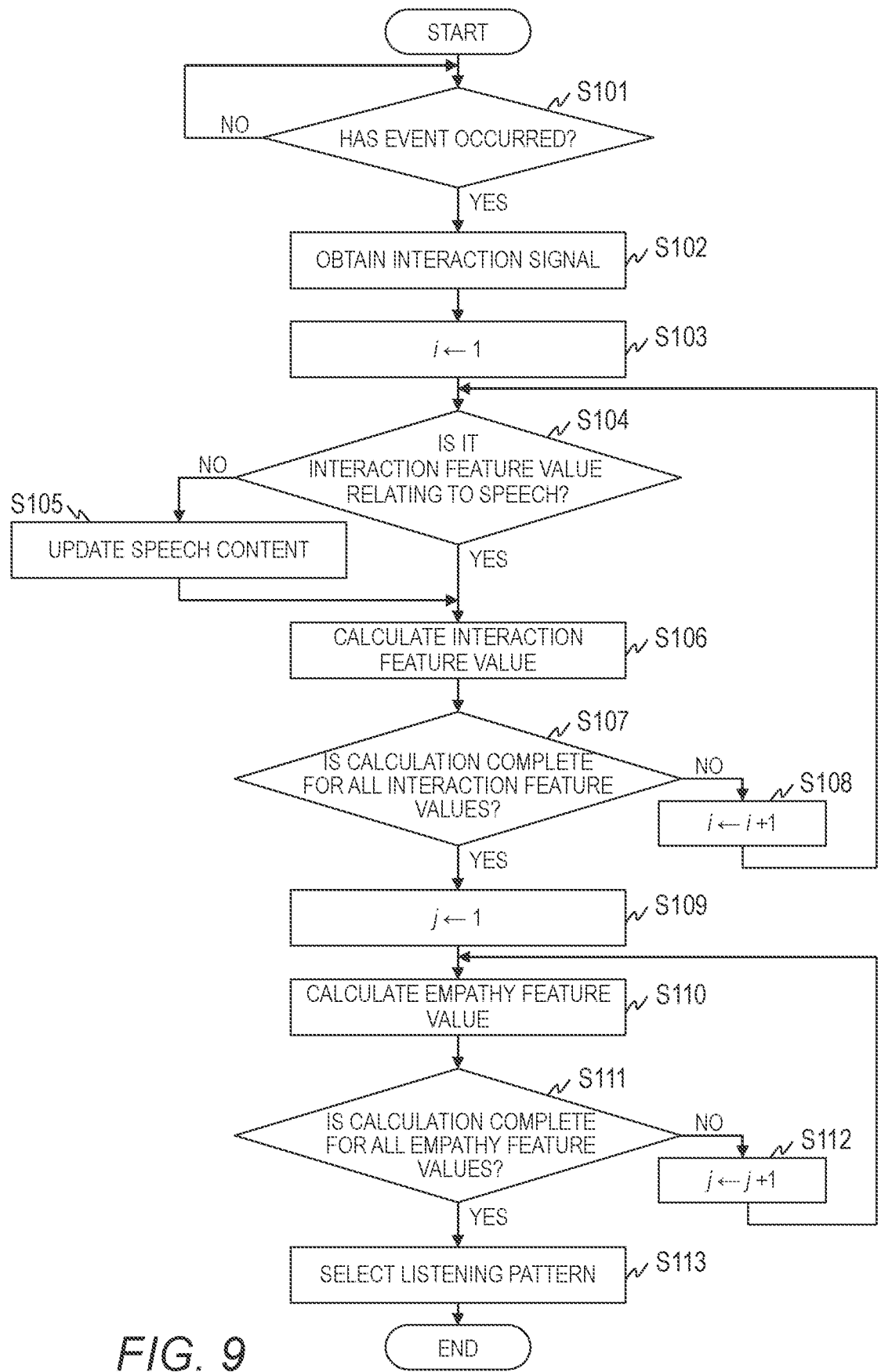
FIG. 9 is a flowchart describing a process executed by an interaction signal processing module of Embodiment 1.

FIG. 9 is a flowchart describing a process executed by the interaction signal processing module 101 of Embodiment 1.

The interaction signal processing module 101 determines whether an event has occurred (step S101). In a case where movement of the user is detected or in a case where speech by the user is detected, for example, then an event is determined to have occurred. Also, in a case where the user performs an operation instructing the start of a process using the input device 150, then the interaction signal processing module 101 determines that an event has occurred.

In a case where the event is determined not to have occurred, then the interaction signal processing module 101 transitions to a standby state until an event occurs.

In a case where the event is determined to have occurred, then the interaction signal processing module 101 obtains an interaction signal through the interaction signal obtaining devices 110 and 120 (step S102).

At this time, the interaction signal processing module 101 stores the obtained interaction signal in the storage device 202. The interaction signal processing module 101 initializes the interaction signal information 211, and adds to the interaction signal information 211 a number of entries equal to the number of obtained interaction signals. The interaction signal processing module 101 sets values for the fields of the added entries.

The interaction signal processing module 101 may repeatedly execute the process of step S102 until all necessary interaction signals are obtained. Also, if a timer is set, then the interaction signal processing module 101 may continue obtaining the interaction signals until the set time elapses.

In a case where a plurality of interaction signal obtaining devices that obtain the same type of interaction signal are included in the interaction system, the correlation or the like between interaction signals over a given period of time of the interaction signal obtaining devices may be calculated as the interaction signal to be stored in the interaction signal information 211.

Next, the interaction signal processing module 101 initializes a variable i (step S103).

Specifically, the interaction signal processing module 101 sets the variable i to "1". Here, the variable i represents the identification number of the interaction feature value.

Next, the interaction signal processing module 101 determines whether the interaction feature value corresponding to the variable i is an interaction feature value relating to speech (step S104).

In a case where it is determined that the interaction feature value corresponding to the variable i is an interaction feature value relating to speech, then the interaction signal processing module 101 generates the speech information 214 (step S105). Specifically, the process below is executed.

(Process A1) The interaction signal processing module 101 obtains an interaction signal corresponding to a voice from the interaction signal information 211. The interaction signal processing module 101 adds an entry to the speech information 214. Additionally, the interaction signal processing module 101 sets the identification information of the obtained interaction signal to the reference ID 602.

(Process A2) The interaction signal processing module 101 executes an analysis process on the interaction signals to convert the voice to text data. The interaction signal processing module 101 sets the text data as the input speech content 601.

The above is the description of the process of step S105.

Next, the interaction signal processing module 101 calculates the interaction feature value corresponding to the variable i on the basis of the obtained interaction signal (step S106). Then, the interaction signal processing module 101 proceeds to step S107. In a case where the determination results of step S104 indicate "YES", then an interaction feature value using a voice is calculated.

In step S104, in a case where it is determined that the interaction feature value corresponding to the variable i is not an interaction feature value relating to speech, then the interaction signal processing module 101 calculates an interaction feature value on the basis of the obtained interaction signal (step S106). Then, the interaction signal processing module 101 proceeds to step S107. In a case where the determination results of step S104 indicate "NO", then an interaction feature value using an image is calculated. Here, the calculation method for the interaction feature value using an image will be described.

(Process B1) In a case where the interaction feature value corresponding to the variable i is an interaction feature value relating to "line of sight", then the interaction signal processing module 101 extracts an image of eyes from a plurality of images (interaction signals). The interaction signal processing module 101 calculates the interaction feature value relating to "line of sight" using the plurality of extracted images.

(Process B2) The interaction signal processing module 101 adds an entry to the interaction feature value information 212. The interaction signal processing module 101 sets identification information to the ID 401 of the added entry, and sets an identification number of the image used when calculating the image of the eyes to the reference ID 402. Also, the interaction signal processing module 101 sets the interaction feature value type 403 of the added entry to "line of sight", and sets the calculated interaction feature value to the interaction feature value 404.

The interaction feature value relating to the "facial orientation" and the interaction feature value relating to "body movement" are also calculated by similar processes. In a case of calculating an interaction feature value relating to the "facial orientation", an image of the entire face is extracted in the process B1, and in a case of calculating an interaction feature value relating to the "body movement", an image of the entire body is extracted in the process B1. The above is a description of the calculation method for the interaction feature value using an image.

In step S107, the interaction signal processing module 101 determines whether calculation of all interaction feature values has been completed (step S107).

In a case where it is determined that calculation of all interaction feature values has not been completed, then the interaction signal processing module 101 adds "1" to the variable i (step S108) and then returns to step S104.

In a case where it is determined that calculation of all interaction feature values has been completed, the interaction signal processing module 101 initializes a variable j (step S109).

Specifically, the interaction signal processing module 101 sets the variable j to "1". Here, the variable j represents the identification number of the empathy feature value.

Next, the interaction signal processing module 101 calculates the empathy feature value corresponding to the variable j (step S110).

At this time, the interaction signal processing module 101 adds an entry to the empathy feature value information 213 and sets identification information to the ID 501 of the added entry. The interaction signal processing module 101 sets, to the reference ID 502 of the added entry, the identification information of the entry corresponding to the interaction feature value used to calculate the empathy feature value. Also, the interaction signal processing module 101 sets a name to the empathy feature value type 503 of the added entry, and sets the calculated empathy feature value to the empathy feature value 504.

Next, the interaction signal processing module 101 determines whether calculation of all empathy feature values has been completed (step S111).

In a case where it is determined that calculation of all empathy feature values has not been completed, then the interaction signal processing module 101 adds "1" to the variable j (step S112) and then returns to step S110.

In a case where it is determined that calculation of all empathy feature values has been completed, the interaction signal processing module 101 selects a listening pattern on the basis of the empathy feature value and the listening pattern definition information 215 (step S113). Then, the interaction signal processing module 101 calls the output information generation module 102, and ends the process.

In a case where an empathy feature value relating to "ease of talking" and an empathy feature value relating to "fun" are calculated, then the interaction signal processing module 101 executes the following process.

The interaction signal processing module 101 compares the empathy feature value relating to "ease of talking" to the empathy feature value relating to "fun", and selects the empathy feature value with the smaller value as a target empathy feature value. The interaction signal processing module 101 refers to the listening pattern definition information 215 and selects an entry in which the name of the selected empathy feature value is set as the empathy feature value type 702.

In Embodiment 1, a listening pattern for increasing the smallest empathy feature value is selected. As a result, the interaction interface can perform a response action for effectively evoking empathy in the user.

Figure 10:
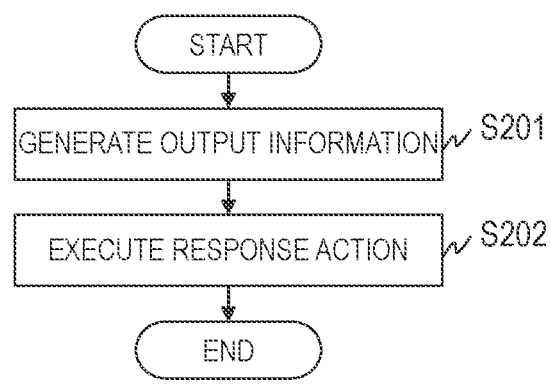
FIG. 10 is a flowchart describing a process executed by an output information generation module of Embodiment 1.

FIG. 10 is a flowchart describing a process executed by the output information generation module 102 of Embodiment 1.

The output information generation module 102 starts the process described below in a case of being called by the interaction signal processing module 101.

The output information generation module 102 generates the output information 216 (step S201). Specifically, the process below is executed.

(Process C1) The output information generation module 102 calculates a control value for controlling the behavior of the interaction interface on the basis of the interaction feature value. The output information generation module 102 calculates a control value for modeling the behavior of the user or a control value for behaving in a manner contrary to the behavior of the user, for example.

(Process C2) The output information generation module 102 generates speech content (output speech content) to be outputted to the user on the basis of the input speech content 601 of the speech information 214. In Embodiment 1, the output information generation module 102 generates speech content that prompts speech from the user or speech content in response to the user's speech. The output information generation module 102 generates speech content that includes words that were in the user's speech content in order to evoke empathy in the user, for example.

Possible methods for generating output speech content include a method that uses a language database or the like, a method that uses a history of past speech content, and the like. In a case of generating output speech content, the output information generation module 102 may refer to the interaction feature value in addition to the input speech content 601.

(Process C3) The output information generation module 102 modifies the control value of a control item to be modified on the basis of the listening pattern. The control item included in the listening pattern is a control item to be modified. The output information generation module 102 modifies a control value relating to line of sight by multiplying the control value relating to line of sight by the value of the line of sight included in the listening pattern.

(Process C4) The output information generation module 102 generates the output information 216 including the control value and the output speech content.

The above is the description of the process of step S201.

Next, the output information generation module 102 executes a response action by controlling the interaction interface on the basis of the output information 216 (step S202).

At this time, the output information generation module 102 may control the interaction interface such that the control value of the previously generated output information 216 is compared to the currently generated output information 216, and control items with a great difference in control value are set such that the degree of change is gradual. For example, in a case where the control value for nodding of the previously generated output information 216 is greater than 0 and the control value for nodding of the currently generated output information 216 is 0, then the output information generation module 102 controls the interaction interface so as to gradually reduce the nodding according to the amount of speech or gradually reduce the frequency of nodding.

In a case where the control value of a given control item of the previously generated output information 216 is 0 in the currently generated output information 216, the output information generation module 102 may control the interaction interface so as to perform the same response action on the basis of the control value of the previously generated output information 216, or may control the interaction interface so as to perform a given response action.

Figure 11:
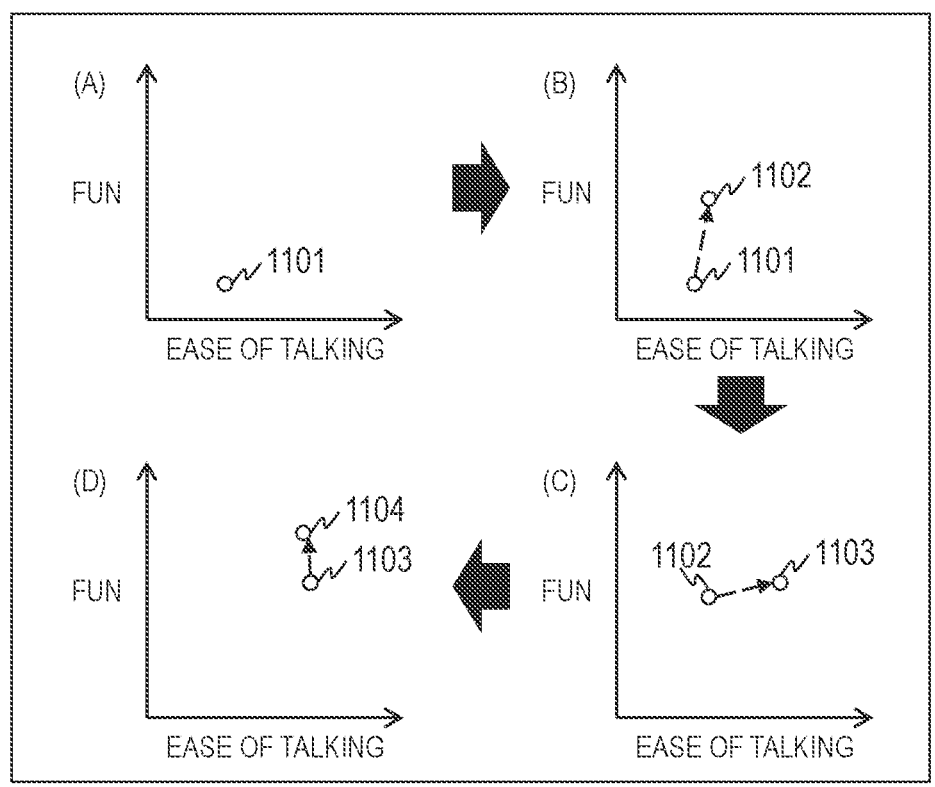
FIG. 11 is a diagram for describing relationship between an amount of change in an empathy feature value and a listening pattern in the interaction system of Embodiment 1.

FIG. 11 is a diagram for describing relationship between the amount of change in the empathy feature value and the listening pattern in the interaction system of Embodiment 1.

Here, the interaction signal processing module 101 compares the empathy feature value relating to "ease of talking" to the empathy feature value relating to "fun", and selects the empathy feature value with the smaller value as a target empathy feature value.

FIG. 11 shows graphs corresponding to an empathy feature value space in which the empathy feature value relating to "fun" is the vertical axis and the empathy feature value relating to "ease of talking" is the horizontal axis.

In graph (A), the state of the user in the feature value space is the point 1101. In this case, the empathy feature value relating to "fun" is selected as the target empathy feature value. Thus, the interaction signal processing module 101 selects the active listening pattern. The empathy feature value relating to "fun" increases as a result of controlling the interaction interface on the basis of the active listening pattern. The state of the user changes from the point 1101 to the point 1102 as shown, for example.

As a result of controlling the interaction interface on the basis of the active listening pattern, in a case where the empathy feature value relationship changes as shown in the graph (B), the interaction signal processing module 101 selects the empathy feature value relating to "ease of talking" as the target empathy feature value. Thus, the interaction signal processing module 101 selects the passive listening pattern. The empathy feature value relating to "ease of talking" increases as a result of controlling the interaction interface on the basis of the passive listening pattern. The state of the user changes from the point 1102 to the point 1103 as shown, for example.

As a result of controlling the interaction interface on the basis of the passive listening pattern, in a case where the empathy feature value relationship changes as shown in the graph (C), the interaction signal processing module 101 selects the empathy feature value relating to "fun" as the target empathy feature value. Thus, the interaction signal processing module 101 selects the active listening pattern. The empathy feature value relating to "fun" increases as a result of controlling the interaction interface on the basis of the active listening pattern. The state of the user changes from the point 1103 to the point 1104 as shown, for example.

In the interaction system of Embodiment 1, the computer 100 determines the items to be controlled in the interaction interface on the basis of the listening pattern and controls the interaction interface on the basis of the items to be controlled, thereby effectively evoking empathy in the user and realizing a continuous interaction with much information.

Modification Example 1 of Embodiment 1

A similar interaction system can be realized without using specialized interaction signal obtaining devices 110 and 120 or specialized interaction output devices 130 and 140 that realize an interaction interface. For example, a smartphone and a tablet device having equivalent functions to the interaction signal obtaining devices 110 and 120 and the interaction output device 130 and 140 may be used. In such a case, the smartphone and tablet device has installed therein software for realizing the interaction interface.

FIG. 12 shows a configuration example of an interaction system according to Modification Example 1 of Embodiment 1.

The interaction system shown in FIG. 12 is constituted of the computer 100 and a smartphone 1200. The smartphone 1200 is connected to the computer 100 through wireless communication.

The smartphone 1200 has a camera 1201, a display 1202, a microphone 1203, speakers 1204, and a button 1205. Also, the smartphone 1200 has an arithmetic device, a storage device, and a communication device, which are not shown.

The camera 1201 and the microphone 1203 function as the interaction signal obtaining devices 110 and 120. The image 1210 displayed in the display 1202 and the speakers 1204 function as the interaction output devices 130 and 140.

Also, the smartphone 1200 may be configured so as to include the functions and information of the computer 100.

Modification Example 2 of Embodiment 1

A configuration was described in which a group including a control item and an adjusted value for a response action by the interaction interface is set as the interaction interface, but the configuration is not limited thereto. A group including a control item and a calculation flag may be set as the listening pattern. The calculation flag is a flag indicating whether to calculate the control value of the control item. In a case where the control value of the control item is to be calculated, the calculation flag is set to "1" and in a case where the control value of the control item is not be calculated, the calculation flag is set to "0", for example.

In this case, the process of step S201 differs slightly.

(Process C'1) The output information generation module 102 identifies the control item having a control value to be calculated on the basis of the listening pattern. The output information generation module 102 calculates the control value of the identified control item on the basis of the interaction feature value.

(Process C'2) The output information generation module 102 generates speech content (output speech content) to be outputted to the user on the basis of the input speech content 601 of the speech information 214.

(Process C'3) The output information generation module 102 generates the output information 216 including the control value and the output speech content.

The control item having the control value to be calculated can be narrowed down on the basis of the listening pattern, and thus, it is possible to reduce the calculation cost required when generating the output information 216.

Embodiment 2

Embodiment 2 differs from Embodiment 1 in that the empathy feature values are calculated using emotion feature values calculated according to emotion signals (emotion information). Below, the description of Embodiment 2 will be focused on differences from Embodiment 1.

Here, terminology used in Embodiment 2 will be explained.

The "emotion signal" is a signal including information relating to the emotions of the user (information on the user's state that cannot be seen from the outside). The emotion signals are biological signals such as a signal for evaluating brain activity such as a brain wave signal or a cerebral blood flow signal, or a signal for evaluating autonomic nerve activity such as the heartbeat interval and the amount of perspiration.

The "emotion feature values" are indices for evaluating the emotions of the user (index for evaluating changes in the user that cannot be seen from the outside). If the biological signal is obtained as an emotion signal, for example, then a biological feature value, such as an event-related potential including the heart rate calculated according to an electrocardiogram and the P300 amplitude calculated according to the brain waves, is calculated as the emotion feature value. Also, a value indicating the psychological state of the user can be calculated from the emotion signal and the emotion feature value can be calculated on the basis of the amount of change in the value. On the basis of the amount of change in the value indicating the psychological state of the user, the biological feature value is set to a large value in a case where the current heart rate is higher than the heart rate at rest, and set to a small value in a case where the current heart rate is lower than the heart rate at rest.

The algorithm that calculates the emotion feature value on the basis of the emotion signal is set in advance.

FIG. 13 shows a configuration example of an interaction system of Embodiment 2.

The interaction system of Embodiment 2 includes emotion signal obtaining devices 1301 and 1302 that obtain emotion signals. The emotion signal obtaining device 1301 obtains a biological signal indicating the brain wave, the cerebral blood flow, and the like. The emotion signal obtaining device 1301 is a near-infrared spectral device, for example. The emotion signal obtaining device 1302 obtains a biological signal indicating the heart rate and the like. The emotion signal obtaining device 1302 is an electrocardiograph, for example.

An information group 103 of Embodiment 2 includes emotion signal information 1400 and emotion feature value information 1500.

FIG. 14 shows an example of a data structure of the emotion signal information 1400 stored by the computer 100 of Embodiment 2.

The emotion signal information 1400 includes entries constituted of an ID 1401, a signal name 1402, an obtaining time 1403, and a pointer 1404. Each entry corresponds to one emotion signal.

The ID 1401 is a field that stores identification information for uniquely identifying the entries of the emotion signal information 1400.

The signal name 1402 is a field that stores information for identifying the type or the like of the emotion signal. In Embodiment 2, the name of the obtaining device that obtained the emotion signal is stored in the signal name 1402. The type of data included in the emotion signal may be stored therein.

The obtaining time 1403 is a field that stores the obtaining time of the emotion signal. The obtaining time 1403 stores a time based on the start time for obtaining the emotion signal, for example.

The pointer 1404 is a field that stores a pointer to a storage region in which the obtained emotion signal is stored. A field that stores the obtained emotion signal may be provided instead of the pointer 1404.

Figures 15, 16A:
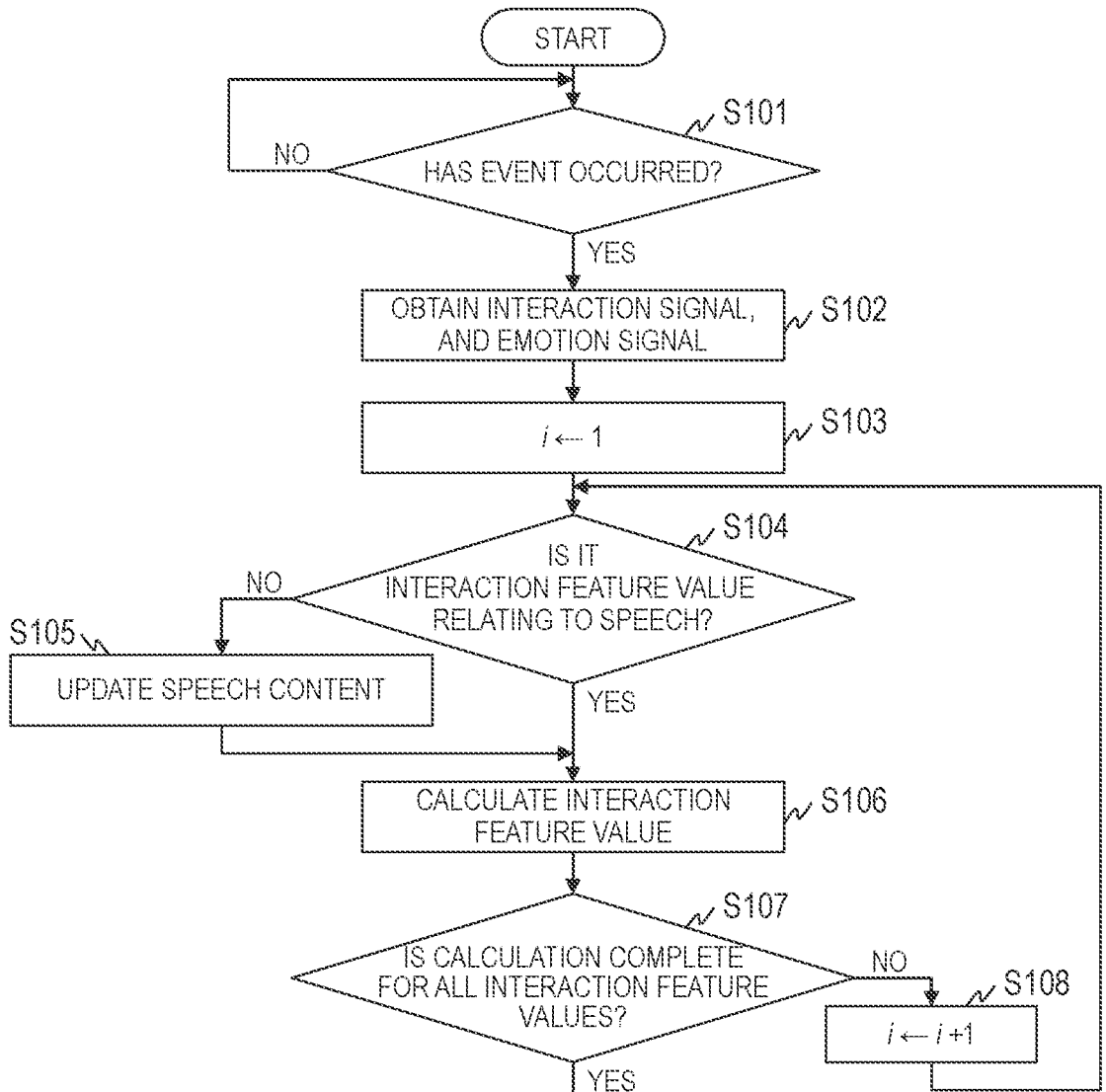
FIG. 15 shows an example of a data structure of emotion feature value information stored by the computer of Embodiment 2.
FIGS. 16A and 16B are flowcharts describing a process executed by an interaction signal processing module of Embodiment 2.

FIG. 15 shows an example of a data structure of the emotion feature value information 1500 stored by the computer 100 of Embodiment 2.

The emotion feature value information 1500 includes entries constituted of an ID 1501, a reference ID 1502, an emotion feature value type 1503, and an emotion feature value 1504. Each entry corresponds to one emotion feature value.

The ID 1501 is a field that stores identification information for uniquely identifying the entries of the emotion feature value information 1500.

The reference ID 1502 is a field that stores identification information of the emotion signal used when calculating the emotion feature value. The reference ID 1502 stores the value of the ID 1401.

The emotion feature value type 1503 is a field that stores the name of the emotion feature value. The emotion feature value type 1503 stores a "heart rate" or the like, for example. The emotion feature value has set thereto an identification number separate from the name.

The emotion feature value 1504 is a field that stores the calculated emotion feature value.

In order to compare the emotion feature values, a normalized value with a minimum value of 0 and a maximum value of 100 may be stored as the emotion feature values 1504. One possible conversion is one in which the value is set to 100 in a case where the heart rate per unit time is double or more the heart rate at rest, and the value is set to 0 in a case where the heart rate per unit time is less than or equal to the heart rate at rest.

If there are a plurality of emotion signal obtaining devices that obtain the same type of emotion signal, then the average of the emotion feature values calculated from the emotion signals is stored in the emotion feature value 1504, for example.

Figure 16B:
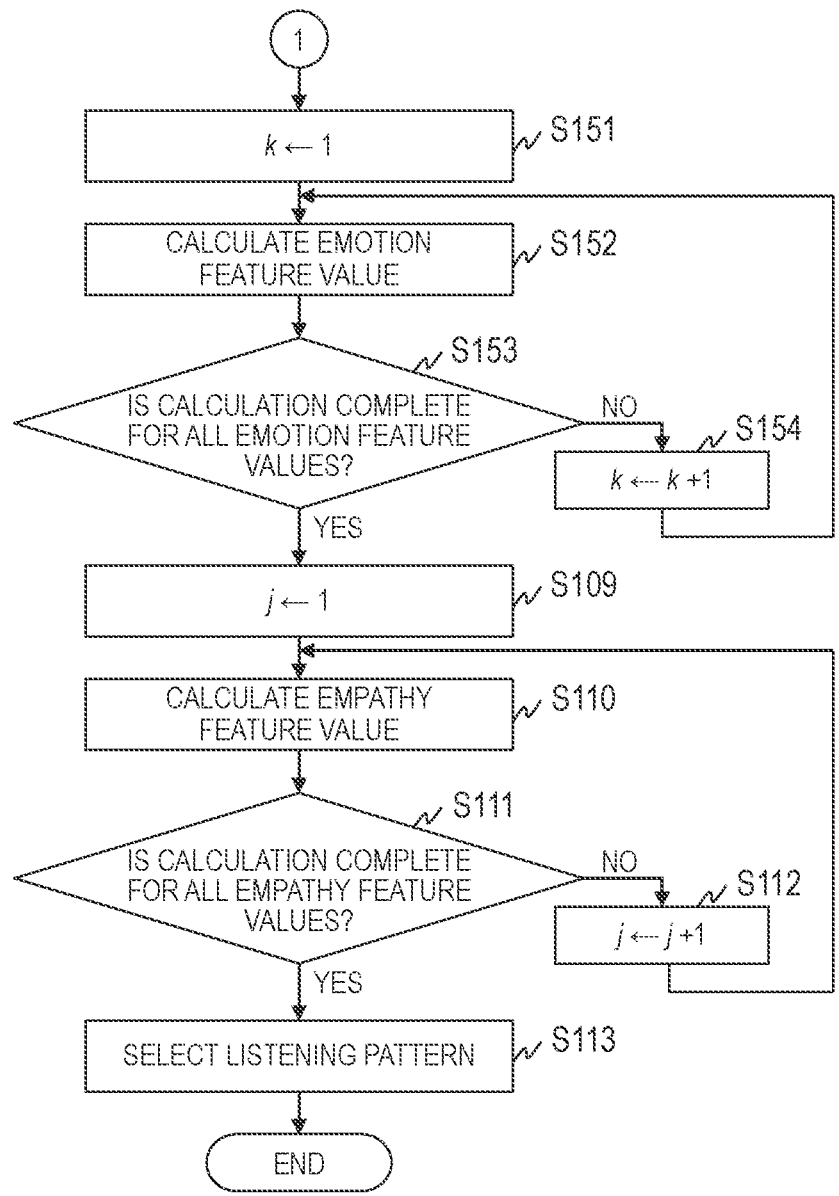
Figure 18A:
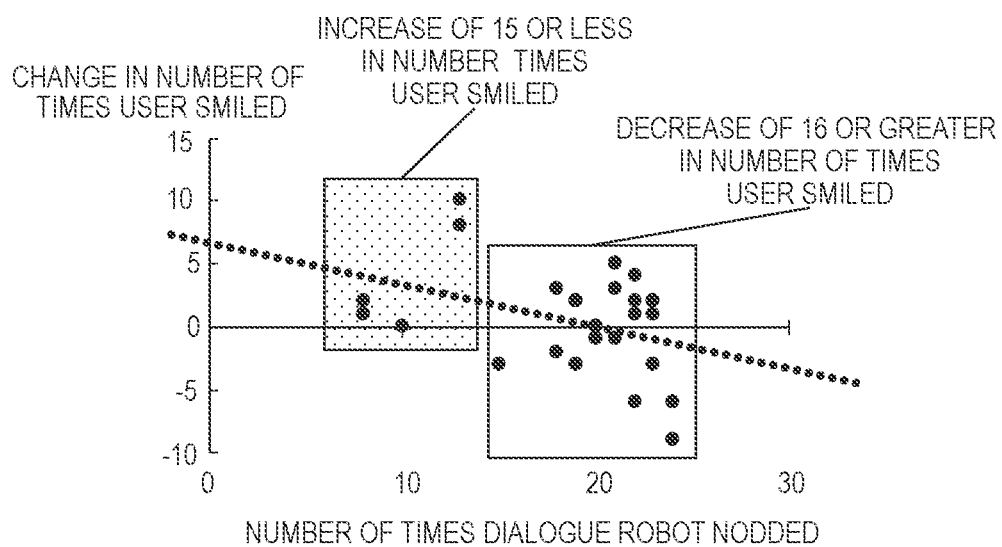
FIG. 18A is a graph that evaluates the relationship between the number of nods by a dialogue robot and the number of smiles by a user.
Figure 18B:
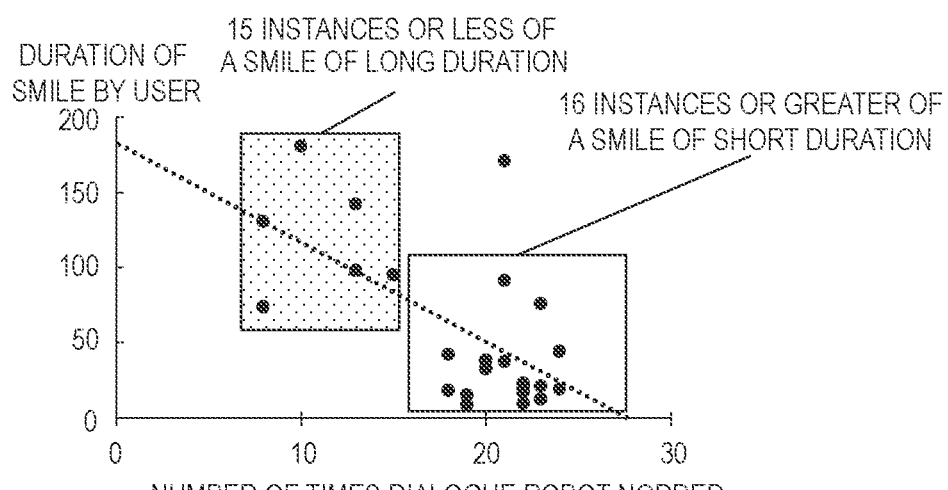
FIG. 18B is a graph that evaluates the relationship between the number of nods by the dialogue robot and the duration of smiles by the user.

FIGS. 16A and 16B are flowcharts describing a process executed by the interaction signal processing module 101 of Embodiment 2.

The process of step S101 and steps S103 to S108 is the same as that of Embodiment 1.

In step S102, the interaction signal processing module 101 obtains an interaction signal from the interaction signal obtaining device 110 and obtains emotion signals from the emotion signal obtaining devices 1301 and 1302 (step S102).

In a case where the determination result of step S107 is "YES", the interaction signal processing module 101 initializes a variable k (step S151).

Specifically, the interaction signal processing module 101 sets the variable k to "1". Here, the variable k represents the identification number of the emotion feature value.

Next, the interaction signal processing module 101 calculates the emotion feature value corresponding to the variable k on the basis of the obtained emotion signal (step S152).

Next, the interaction signal processing module 101 determines whether calculation of all emotion feature values has been completed (step S153).

In a case where it is determined that calculation of all emotion feature values has not been completed, then the interaction signal processing module 101 adds "1" to the variable k (step S154) and then returns to step S152.

In a case where it is determined that calculation of all emotion feature values has been completed, the interaction signal processing module 101 proceeds to step S109. The process of step S109 and steps S111 to S113 is the same as that of Embodiment 1.

In step S110, the interaction signal processing module 101 calculates the empathy feature value on the basis of the emotion feature value. The algorithm that calculates the empathy feature value on the basis of the emotion feature value is set in advance.

The interaction signal may match the emotion signal. Also, the interaction feature value may match the emotion feature value.

The interaction signal and the emotion signal are obtained separately, but the emotion signal may be extracted from the interaction signal. In such a case, the interaction system does not include the emotion signal obtaining devices 1301 and 1302. In a case where an eye image is extracted from the interaction signal, for example, the computer 100 can calculate a value for evaluating changes in autonomic nerve activity according to the diameter of the pupils of the user (pupil diameter).

An algorithm that selects the listening pattern on the basis of the combination of the interaction feature value and the emotion feature value can also be used.

According to the interaction system of Embodiment 2, the computer 100 can select the listening pattern on the basis of the emotion feature value that is an index for evaluating the change in emotions of the user. As a result, it is possible to effectively evoke empathy in the user and realize a continuous interaction with much information.

Embodiment 3

In Embodiment 3, a GUI (graphical user interface) for configuring settings of the computer 100 in each embodiment will be described.

FIG. 17 shows an example of a GUI for configuring settings of the computer 100 of Embodiments 1 and 2.

A GUI 1700 shown in FIG. 17 is for configuring information settings, and includes an interaction feature value setting section 1710, an emotion feature value setting section 1720, an empathy feature value setting section 1730, a listening pattern setting section 1740, a learning process setting section 1750, a selection algorithm setting section 1760, and a save button 1770.

The interaction feature value setting section 1710 is a section for setting the interaction feature values, and includes a setting count display column 1711, radio buttons 1712, and a setting field group 1713. By inputting a value in the interaction feature value setting section 1710, the interaction feature value to be calculated can be set in the computer 100.

The setting count display column 1711 is a column for displaying the number of types of set interaction feature values.

The radio buttons 1712 are operated in a case of setting the interaction feature values. By operating the radio buttons 1712, input to the setting field group 1713 is possible.

The setting field group 1713 includes fields for setting the type of interaction signal and the type of interaction feature value. The setting field group 1713 may include other fields.

The emotion feature value setting section 1720 is a section for setting the emotion feature values, and includes a setting count display column 1721, radio buttons 1722, and a setting field group 1723. By inputting a value in the emotion feature value setting section 1720, the emotion feature value to be calculated can be set in the computer 100.

The setting count display column 1721 is a column for displaying the number of types of set emotion feature values.

The radio buttons 1722 are operated in a case of setting the emotion feature values. By operating the radio buttons 1722, input to the setting field group 1723 is possible.

The setting field group 1723 includes fields for setting the type of emotion signal and the type of emotion feature value. The setting field group 1723 may include other fields.

The empathy feature value setting section 1730 is a section for setting the empathy feature values, and includes a setting count display column 1731, radio buttons 1732, and a setting field group 1733. By inputting a value in the empathy feature value setting section 1730, the empathy feature value to be calculated can be set in the computer 100.

The setting count display column 1731 is a column for displaying the number of types of set empathy feature values.

The radio buttons 1732 are operated in a case of setting the empathy feature values. By operating the radio buttons 1732, input to the setting field group 1733 is possible.

The setting field group 1733 includes fields for setting the type of empathy feature value, a field for setting the type of feature value used to calculate the empathy feature value, and an add button. The add button is an operation button for adding fields for setting the type of feature value used to calculate the empathy feature value.

The setting field group 1733 may include other fields. The feature value to be used for calculating the empathy feature value is set to either the interaction feature value or the empathy feature value. A plurality of interaction feature values may be set and a plurality of emotion feature values may be set. Also, the interaction feature and the emotion feature value may be combined.

The listening pattern setting section 1740 is a section for setting the listening patterns, and includes a setting count display column 1741, radio buttons 1742, and a setting field group 1743. By inputting a value in the listening pattern setting section 1740, the listening pattern definition information 215 can be set in the computer 100.

The setting count display column 1741 is a column for displaying the number of set listening patterns.

The radio buttons 1742 are operated in a case of setting the listening patterns. By operating the radio buttons 1742, input to the setting field group 1743 is possible.

The setting field group 1743 includes fields for setting control items and control values, and add buttons. The add button is an operation button for adding fields.

The learning process setting section 1750 is a section for setting the learning method for listening patterns, and includes a setting display column 1751 and a setting radio button group. By inputting a value in the learning process setting section 1750, the learning method can be set.

FIG. 17 includes radio buttons for selecting whether or not there is learning data and radio buttons for selecting the learning data to be used. The setting display column 1751 displays operation results of the setting radio button group.

The selection algorithm setting section 1760 is for selecting the algorithm for selecting the listening pattern. The selection algorithm setting section 1760 includes a section for inputting the algorithm. In FIG. 17, this takes the form of a pull-down menu.

The save button 1770 is operated in a case of saving the inputs of the setting sections.

In a case where the listening pattern setting section 1740 is operated, then operation of the learning process setting section 1750 is disabled. On the other hand, in a case where the learning process setting section 1750 is operated, then control of the listening pattern setting section 1740 is disabled.

By using the GUI 1700, information necessary for setting feature values, listening patterns, and the selection method or the like can be easily set, and the set values can be easily confirmed and changed.

The GUI 1700 may include a button for switching between display mode and editing mode. The GUI 1700 shown in FIG. 17 is merely one example and is not limited to the shown example.

A representative example of the invention other than what is disclosed in the claims is as follows.

(1) A control method for an interaction system that provides an interaction interface that interacts with a user, the interaction system including:

a computer having an arithmetic device, a storage device coupled to the arithmetic device, and a connecting interface coupled to the arithmetic device; and an information obtaining device configured to obtain information relating to a state of the user, the storage device storing listening pattern definition information for managing data in which a type of a second feature value that is an index representing a degree of empathy by the user towards the interaction interface is associated with a listening pattern that defines a tendency of a response action in an interaction with the interaction interface, and the control method for the interaction system including:

a first step of calculating, by the arithmetic device, at least one first feature value that is an index for evaluating a change in state during speech by the user on the basis of information obtained by the information obtaining device;

a second step of calculating, by the arithmetic device, a plurality of second feature values on the basis of the at least one first feature value;

a third step of selecting, by the arithmetic device, a target second feature value from among the plurality of second feature values;

a fourth step of selecting, by the arithmetic device, the listening pattern corresponding to the target second feature value with reference to the listening pattern definition information;

a fifth step of generating, by the arithmetic device, output information for controlling the interaction interface on the basis of the at least one first feature value and the selected listening pattern; and a sixth step of controlling, by the arithmetic device, the interaction interface on the basis of the output information.

(2) The control method for an interaction system according to (1), wherein the third step includes a step of selecting, by the arithmetic device, the target second feature value on the basis of the magnitude of each of the plurality of second feature values.

(3) The control method for an interaction system according to (1), wherein the fifth step includes:

a step of calculating, by the arithmetic device, a control value of each of a plurality of control items of the interaction interface on the basis of the at least one first feature value;

a step of modifying, by the arithmetic device, the control value of at least one of the plurality of control items on the basis of the listening pattern; and a step of generating, by the arithmetic device, the output information including a plurality of control values of the plurality of control items.

(4) The program according to (1), wherein the fifth step includes:

a step of identifying, by the arithmetic device, a control item to be controlled from among a plurality of control items of the interaction interface on the basis of the listening pattern;

a step of calculating, by the arithmetic device, a control value of the identified control item on the basis of the at least one first feature value; and a step of generating, by the arithmetic device, the output information including the control value of the identified control item.

(5) The control method for an interaction system according to (1), wherein the listening pattern is constituted of a plurality of control items and a plurality of adjusted values of the interface for realizing a response action for changing the target second feature value.

The present invention is not limited to the above embodiment and includes various modification examples. In addition, for example, the configurations of the above embodiment are described in detail so as to describe the present invention comprehensibly. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits therefor. In addition, the present invention can be realized by program codes of software that realizes the functions of the embodiment. In this case, a storage medium on which the program codes are recorded is provided to a computer, and a CPU that the computer is provided with reads the program codes stored on the storage medium. In this case, the program codes read from the storage medium realize the functions of the above embodiment, and the program codes and the storage medium storing the program codes constitute the present invention. Examples of such a storage medium used for supplying program codes include a flexible disk, a CD-ROM, a DVD-ROM, a hard disk, a solid state drive (SSD), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, Perl, shell scripts, PHP, Python and Java.

It may also be possible that the program codes of the software that realizes the functions of the embodiment are stored on storing means such as a hard disk or a memory of the computer or on a storage medium such as a CD-RW or a CD-R by distributing the program codes through a network and that the CPU that the computer is provided with reads and executes the program codes stored on the storing means or on the storage medium.

In the above embodiment, only control lines and information lines that are considered as necessary for description are illustrated, and all the control lines and information lines of a product are not necessarily illustrated. All of the configurations of the embodiment may be connected to each other.

What is claimed is:

1. An interaction system that provides an interaction interface that interacts with a user, the interaction system comprising:
   a computer having a processor, a storage device coupled to the processor, and an input interface that is coupled to the processor;
   a microphone, coupled to the processor, configured to obtain first information relating to a state of the user; and
   a camera, coupled to the processor, configured to obtain second information relating to the state of the user,
   wherein the storage device stores listening pattern definition information for managing data in which a type of a second feature value that is an index representing a degree of empathy of the user towards the interaction interface is associated with a listening pattern that defines a response action performed by the interaction interface, and
   wherein the processor is configured to:
   calculate a plurality of first feature values, which are respective indices for evaluating a change in state during speech, eye movement and facial expression of the user on the basis of the obtained first information and the second information;
   calculate a plurality of second feature values based on the first feature values;
   select a target second feature value from among the plurality of second feature values as a smaller second feature value among the plurality of second feature values;
   select the listening pattern corresponding to the target second feature value based on the listening pattern definition information;
   generate output information for controlling the interaction interface based on the at least one first feature value and the selected listening pattern; and
   control the interaction interface on the basis of the output information.

2. The interaction system according to claim 1,
   wherein the processor is configured to select the target second feature value on the basis of the magnitude of each of the plurality of second feature values.

3. The interaction system according to claim 1,
   wherein the processor is configured to:
   calculate a control value of each of a plurality of control items of the interaction interface on the basis of the at least one first feature value;
   modify the control value of at least one of the plurality of control items on the basis of the listening pattern; and
   generate the output information including a plurality of control values of the plurality of control items.

4. The interaction system according to claim 1,
   wherein the processor is configured to:
   identify a control item to be controlled from among a plurality of control items of the interaction interface, on the basis of the listening pattern,
   calculate a control value of the identified control item on the basis of the at least one first feature value, and
   generate the output information including the control value of the identified control item.

5. The interaction system according to claim 1,
   wherein the listening pattern is constituted of a plurality of control items and a plurality of adjusted values of the interaction interface for realizing the response action for changing a given second feature value.

6. An apparatus that provides an interaction interface that interacts with a user, the apparatus comprising:
   a processor;
   a storage device coupled to the processor;
   a microphone, coupled to the processor, configured to obtain first information relating to a state of the user;
   a camera, coupled to the processor, configured to obtain second information relating to the state of the user,
   wherein the storage device stores listening pattern definition information for managing data in which a type of a second feature value that is an index representing a degree of empathy of the user towards the interaction interface is associated with a listening pattern that defines a response action performed by the interaction interface, and
   wherein the processor is configured to:
   calculate a plurality of first feature values, which are respective indices for evaluating a change in state during speech, eye movement and facial expression of the user on the basis of the obtained first information and second information;
   calculate a plurality of second feature values on the basis of the first feature values;
   select a target second feature value from among the plurality of second feature values as a smaller second feature value among the plurality of second feature values;
   select the listening pattern corresponding to the target second feature value based on the listening pattern definition information;
   generate output information for controlling the interaction interface based on the at least one first feature value and the selected listening pattern; and
   control the interaction interface on the basis of the output information.

7. The apparatus according to claim 6,
   wherein the processor is configured to select the target second feature value based on the magnitude of each of the plurality of second feature values.

8. The apparatus according to claim 6,
   wherein the processor is configured to:
   calculate a control value of each of a plurality of control items of the interaction interface on the basis of the at least one first feature value;
   modify the control value of at least one of the plurality of control items on the basis of the listening pattern; and
   generate the output information including a plurality of control values of the plurality of control items.

9. The apparatus according to claim 6,
   wherein the processor is configured to:
   identify a control item to be controlled from among a plurality of control items of the interaction interface, on the basis of the listening pattern;

calculate a control value of the identified control item on the basis of the at least one first feature value, and generate the output information including the control value of the identified control item.

10. The apparatus according to claim 6, wherein the listening pattern is constituted of a plurality of control items and a plurality of adjusted values of the interaction interface for realizing the response action for changing a given second feature value.

11. A non-transitory computer readable storage medium having stored thereon a program which is executed by a computer that provides an interaction interface that interacts with a user, wherein the computer has a processor, a storage device coupled to the processor, and an input interface configured to obtain information relating to a state of the user, and wherein the computer stores listening pattern definition information for managing data in which a type of a second feature value that is an index representing a degree of empathy of the user towards the interaction interface is associated with a listening pattern that defines a response action performed by the interaction interface, and wherein, upon execution, the program causing the computer to execute procedures comprising:

a first procedure of calculating a plurality of feature values, which are respective indices for evaluating a change in state during speech, eye movement and facial expression of the user on the basis of the obtained information;

a second procedure of calculating a plurality of second feature values on the basis of the first feature values;

a third procedure of selecting a target second feature value from among the plurality of second feature values as a smaller second feature value among the plurality of second feature values;

a fourth procedure of selecting the listening pattern corresponding to the target second feature value based on the listening pattern definition information;

a fifth procedure of generating output information for controlling the interaction interface based on the at least one first feature value and the selected listening pattern; and a sixth procedure of controlling the interaction interface on the basis of the output information.

12. The non-transitory computer readable storage medium according to claim 11, wherein the third procedure includes a procedure of selecting the target second feature value based on the magnitude of each of the plurality of second feature values.

13. The non-transitory computer readable storage medium according to claim 11, wherein the fifth procedure includes:

a procedure of calculating a control value of each of a plurality of control items of the interaction interface on the basis of the at least one first feature value;

a procedure of modifying the control value of at least one of the control items on the basis of the listening pattern; and a procedure of generating the output information including a plurality of control values of the plurality of control items.

14. The non-transitory computer readable storage medium according to claim 11, wherein the fifth procedure includes:

a procedure of identifying a control item to be controlled from among a plurality of control items of the interaction interface on the basis of the listening pattern;

a procedure of calculating a control value of the identified control item on the basis of the at least one first feature value; and a procedure of generating the output information including the control value of the identified control item.

* * * * *